(12) United States Patent  (10) Patent No.: US 7,158,274 B2
Kim  (45) Date of Patent: Jan. 2, 2007

(54) PICK-UP APPARATUS FOR DIGITAL STORAGE MEDIUM

(75) Inventor: Kun Yul Kim, Seoul (KR)

(73) Assignee: Daewoo Electronics Corp., Seoul (KR)

( * ) Notice: Subject to any disclaimer, the term of this patent is extended or adjusted under 35 U.S.C. 154(b) by 190 days.

(21) Appl. No.: 10/847,313

(22) Filed: May 18, 2004

(65) Prior Publication Data

US 2005/0128542 A1   Jun. 16, 2005

(30) Foreign Application Priority Data

Dec. 10, 2003  (KR) ...................... 10-2003-0089681

(51) Int. Cl.
*G03H 1/22* (2006.01)
(52) U.S. Cl. ........................................ 359/32; 369/103
(58) Field of Classification Search .................. 359/32; 369/103
See application file for complete search history.

(56) References Cited

U.S. PATENT DOCUMENTS 6,738,322 B1 *  5/2004  Amble et al. ............ 369/44.27

FOREIGN PATENT DOCUMENTS

WO       03/032300       4/2003

* cited by examiner

*Primary Examiner*—Alessandro Amari
(74) *Attorney, Agent, or Firm*—Bacon & Thomas, PLLC

(57) ABSTRACT

In order to pick up a digital storage medium including a holographic storage medium and a reflective storage medium, a first and a second beam each of which has a different wavelength are used and a reflected beam and a reconstructed signal beam are propagated through a propagation path, wherein the first beam is reflected by the digital storage medium to generate the reflected beam and the second beam is diffracted by a holographic interference pattern in the holographic storage medium to generate the reconstructed signal beam. A polarizing beam splitter is used to split the reflected beam from the propagation path while a laser line mirror is used to separate the reconstructed signal beam from the propagation path.

14 Claims, 3 Drawing Sheets

PICK-UP APPARATUS FOR DIGITAL STORAGE MEDIUM

FIELD OF THE INVENTION

The present invention relates to a pick-up apparatus for a digital storage medium; and, more particularly, to a pick-up apparatus capable of implementing a pick-up scheme for a digital storage medium including a reflective storage medium and a holographic storage medium by using an objective lens for a reflective storage medium.

BACKGROUND OF THE INVENTION

The demand for a holographic storage medium storing a plurality of data therein has been increased, wherein the holographic storage medium is required to have a high storage capacity.

In a typical system using a holographic storage medium therein such as a holographic ROM system, a reference beam and a modulated signal beam interfere with each other to generate a holographic interference pattern therebetween, wherein the modulated signal beam is generated by modulating the signal beam with a holographic signal of binary data to be recorded in the holographic storage medium. The holographic interference pattern may be stored in a disk-type holographic storage medium made of, e.g., an optical refractive crystal whose reaction on interference pattern depends on the amplitude and phase thereof. The modulated signal beam may be reconstructed by illuminating the holographic interference pattern with a reconstructing beam, of the same wavelength but with wavefronts that are "complex conjugate" (the reverse wavefront and direction) to the wavefronts in the reference beam, wherein the reconstructing beam is refracted through the holographic interference pattern to produce binary data.

In the meantime, a reflecting property is used to record a reflective signal of binary data in a reflective storage medium, e.g., DVD or CD, and to read the reflective signal from the reflective storage medium. In order to effectively use the reflecting property, it is preferable that the laser beam is vertically illuminated on the reflective storage medium. A cylindrical lens may be used to implement a focusing servo scheme on the reflective storage medium.

Since, however, the holographic storage medium uses the holographic property to record and reconstruct the holographic signal of binary data while the reflective storage medium uses the reflective property to record and read the reflective signal of binary data, a pick-up apparatus for a digital storage medium including the holographic and the reflective storage medium is required to have a down compatibility on the reflective storage medium.

SUMMARY OF THE INVENTION

It is, therefore, an object of the present invention to provide a pick-up apparatus capable of implementing a pick-up scheme for a digital storage medium including a reflective storage medium and a holographic storage medium by using an objective lens for a reflective storage medium.

In accordance with a preferred embodiment of the present invention, there is provided a pick-up apparatus for a digital storage medium including a holographic storage medium in which a holographic property is used to reconstruct a holographic signal stored therein and a reflective storage medium in which a reflective property is used to read a reflective signal stored therein comprising:

means for generating a first and a second beam each of which has a different wavelength;

means for propagating a reflected beam and a reconstructed signal beam through a propagation path, wherein the digital storage medium reflects the first beam to generate the reflected beam having the reflective signal therein and a holographic interference pattern in the holographic storage medium diffracts the second beam to generate the reconstructed signal beam having the holographic signal therein;

means for splitting the reflected beam from the propagation path to detect the reflective signal from the reflected beam;

means for separating the reconstructed signal beam from the propagation path to detect the holographic signal from the reconstructed signal beam.

In accordance with another preferred embodiment of the present invention, there is provided a pick-up apparatus for a digital storage medium including a holographic storage medium in which a holographic property is used to reconstruct a holographic signal stored therein and a reflective storage medium in which a reflective property is used to read a reflective signal stored therein comprising:

first and second laser for generating a first and a second beam with a first and a second wavelength which are different from each other, respectively, wherein the first beam and the second beam have a P and an S linear polarization, respectively;

means, faced with the second laser, for converting a polarization of the second beam from the S linear polarization to a S circular polarization;

means for introducing the second beam with the S circular polarization to the holographic storage medium so that the second beam is diffracted by a holographic interference pattern in the holographic storage medium to generate a reconstructed signal beam having the holographic signal therein;

separating means, disposed on a propagation path of the first beam, for transmitting a beam with the first wavelength and reflecting a beam with the second wavelength;

splitting means, disposed on the propagation path of the first beam, for transmitting a beam with a P linear polarization and reflecting a beam with an S linear polarization;

changing means, faced with the splitting means and disposed on the propagation path of the first beam, for changing a polarization of the first beam so that the polarization of the first beam is changed from the P linear polarization to the P circular polarization; and means, faced with the changing means and disposed on the propagation path of the first beam, for converging the first beam on a reflective layer in the digital storage medium to generate a reflected beam having the reflective signal therein and receiving the reflected and the reconstructed signal beam to be propagated through the propagation path, wherein the reflected and the reconstructed signal beam are transmitted through the changing means so that polarizations of the reflected and the reconstructed signal beam are changed from a P and an S circular polarization to an S and a P linear polarization, respectively, the reflected beam with the S linear polarization is reflected once more by the splitting means so that the reflective signal is detected from the reflected beam, and the reconstructed signal beam with the second wavelength is reflected by the separating means so that the reconstructed signal is detected from the reconstructed signal beam.

In accordance with still another preferred embodiment of the present invention, there is provided a holographic storage medium comprising:

a reflective layer for reflecting a first beam to generate a reflected beam; and a holographic recording layer, disposed on the reflective layer, for storing a holographic interference pattern by which a second beam is diffracted to generate a reconstructed signal beam from which a holographic signal is extracted, wherein a wavelength of the first beam is different from that of the second beam.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Figure 1:
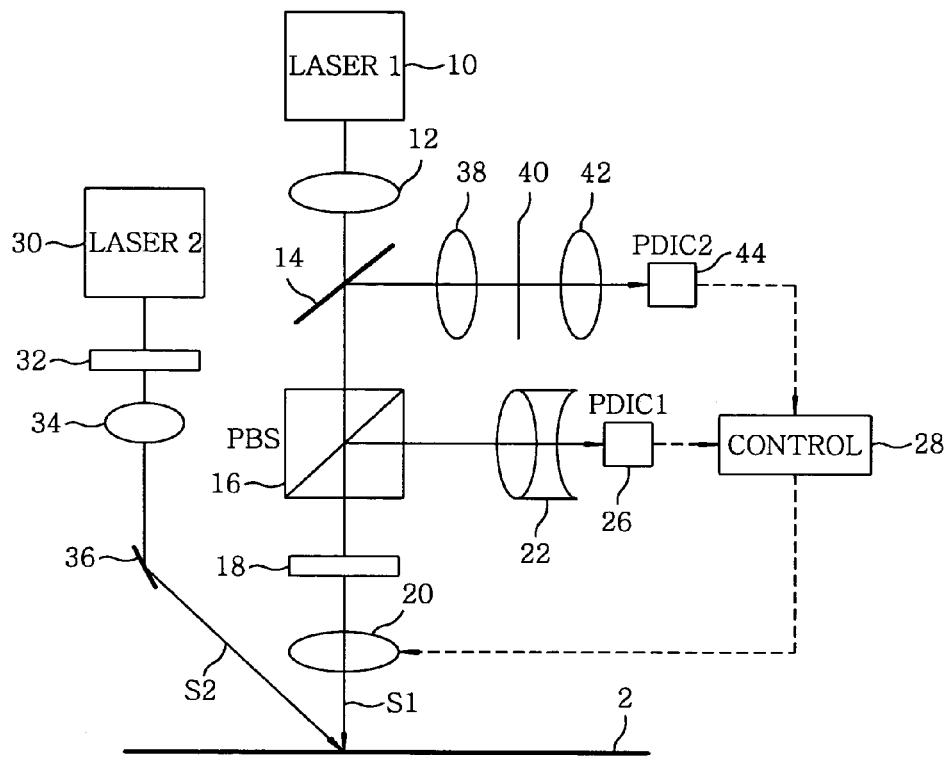
FIG. 1 shows a block diagram of a pick-up apparatus for a digital storage medium in accordance with the present invention.

FIG. 1 shows a pick-up apparatus for a digital storage medium in accordance with a preferred embodiment of the present invention. The pick-up apparatus includes a digital storage medium 2, a first laser 10, a collimating lens 12, a laser line mirror 14, a polarizing beam splitter(PBS) 16, a first quarter wave plate (QWP) 18, an objective lens 20, a cylindrical lens 22, a reflective detector (PDIC1) 26, a control unit 28, a second laser 30, a second quarter wave plate 32, a reducing unit 34, a mirror 36, a first lens 38, a pinhole plate 40, a second lens 42 and a holographic detector (PDIC2) 44.

The digital storage medium 2 includes a holographic storage medium and a reflective storage medium. The holographic storage medium stores a holographic interference pattern generated by an interference between a reference and a modulated signal beam, wherein the modulated signal beam is generated by modulating the signal beam with a holographic signal, i.e., information to be recorded in the holographic storage medium, and a wavelength and a polarization of the reference beam are identical with those of the signal beam. If a reconstructing beam corresponding to the reference beam is illuminated on the holographic storage medium, the reconstructing beam is diffracted by the holographic interference pattern in accordance with a holographic principle to generate a reconstructed signal beam corresponding to the modulated signal beam. In the meantime, the reflective storage medium stores thereto and detects therefrom a reflective signal, i.e., information to be recorded in the reflective storage medium, by using a reflective property. For instance, the reflective storage medium may be a read-only disk (such as a compact disk read-only memory (CD-ROM) or a digital video disk read-only memory (DVD-ROM)), a magneto-optical disk or a phase change optical disk.

The first and the second laser 10, 30 generate a first and a second beam, respectively, which are illuminated on the digital storage medium 2. The first and the second beam have a first and a second wavelength, respectively, which are different from each other.

The first beam is used to detect the reflective signal from the reflective storage medium and to implement a focus servo on the digital storage medium 2. The first beam is introduced to the digital storage medium 2 through an introduction path, i.e., a first beam path S1, and then the first beam is reflected from the digital storage medium 2 through a reflection path. It is preferable that the introduction path of the first beam is substantially perpendicular to the digital storage medium 2 in order that the introduction path is substantially identical to the reflection path and, therefore, the introduction path and the reflection path function as a propagation path described hereinafter. If the DVD-ROM is used as the reflective storage medium 2, a red laser beam with a first wavelength of about 650 nm is preferably used as the first beam.

The second beam is used as the reconstructing beam for detecting the holographic signal from the holographic storage medium and it is preferably that the second beam, i.e., the reconstructing beam, is of the same wavelength but with wavefronts that are "complex conjugate" (the reverse wavefront and the reverse direction) to the wavefronts in the reference beam of the holographic storage medium. Since the second beam, being the complex conjugate of the reference beam, propagates in the reverse direction of the reference beam, the holographic interference patterns impart the reconstructed signal beam that is identical to the complex conjugate of the modulated signal beam. In other words, the reconstructed signal beam appears to be released from the holographic interference pattern in "reverse" to the modulated signal beam. Therefore, it is preferable that, during a recording process of a holographic signal, the modulated signal beam is vertically introduced to the holographic storage medium such that the reconstructed signal beam generated by a diffraction of the second beam may propagate through the propagation path, i.e., through the reflection path of the first beam, in accordance with the present invention. A green laser beam with a second wavelength of about 532 nm is preferably used as the second beam.

Even though the preferred embodiment will be described hereinafter for the case that the first beam has a P linear polarization while the second beam has an S linear polarization, the present invention is not limited thereto. That is, the present invention may be applied to the case that the first beam has an S linear polarization while the second beam has a P linear polarization.

Referring to FIG. 1, the first laser 10 emits the first beam. The first beam, being a P linear polarized red laser beam with the first wavelength of 650 nm, is introduced through the introduction path, i.e., the first beam path S1, to the digital storage medium 2. Specifically, since the collimating lens 12 is faced with the first laser 1, the first beam is transmitted through the collimating lens 12 to become a collimated beam.

Figure 4:
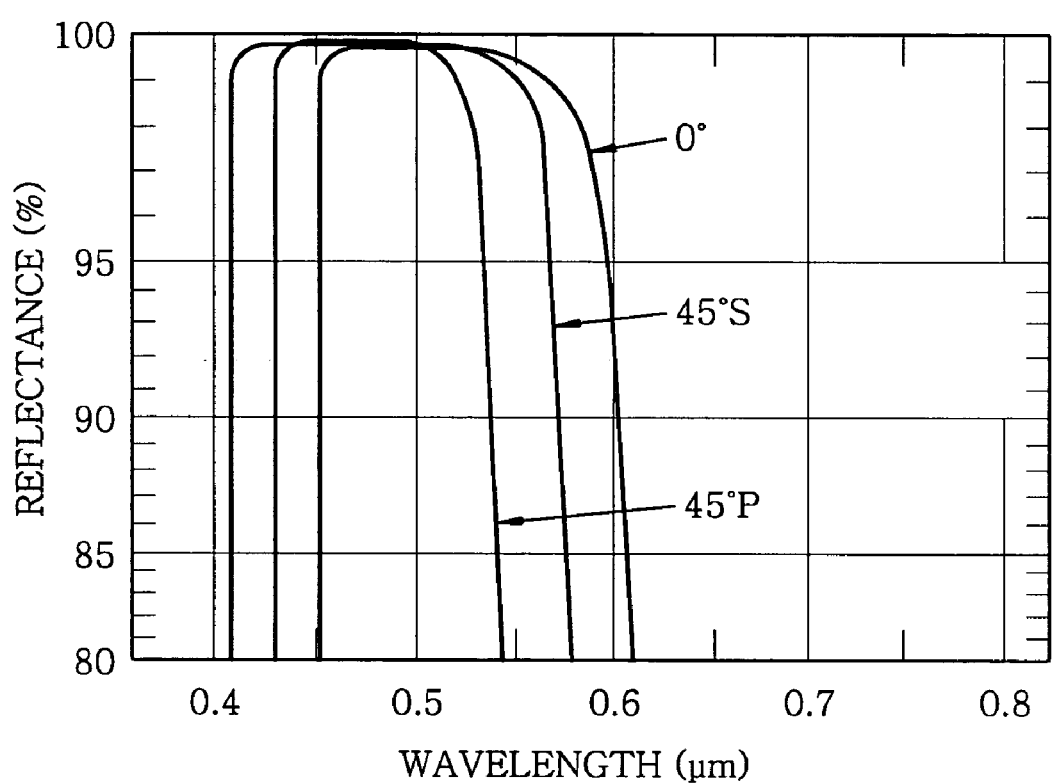
FIG. 4 offers a graph for illustrating a relation between a reflectance and a wavelength on a laser line mirror shown in FIG. 1.

The collimated beam of the first beam is transmitted through the laser line mirror 14 disposed on the propagation path of the first beam. The laser line mirror 14 is a mirror for reflecting only a beam within a predetermined wavelength range. It is preferable that the laser line mirror 14 transmits the first beam with the first wavelength of about 650 nm but reflects the second beam with the second wavelength of about 532 nm in accordance with the present invention. Referring to FIG. 4, there is shown a graph for illustrating a relationship between a reflectance and a wavelength of a beam introduced in the laser line mirror 14 to be used in accordance with the present invention. If a beam with an P linear polarization is introduced to the laser line mirror 14 with an incident angle of 45°, the reflectance in a wavelength range from about 430 nm to about 535 nm is about 98% or more while the reflectance in a wavelength range of about 610 nm or more is sharply dropped. Therefore, the first beam with the first wavelength of about 650 nm is transmitted through the laser line mirror 14.

The PBS 16 is disposed on the propagation path of the first beam and faced with the laser line mirror 14. The PBS 16 causes a beam with an S linear polarization to be reflected but a beam with a P linear polarization to be transmitted. Since the first beam transmitted through the laser line mirror 14 has a P linear polarization, the first beam is transmitted through the PBS 16.

The first quarter wave plate 18 is disposed on the propagation path of the first beam and faced with the PBS 16. The first beam is transmitted through the first quarter wave plate 18 and the polarization of the first beam is changed from the P linear polarization to a P circular polarization. Specifically, the first quarter wave plate 18 is used to convert the polarization of the beam so that an S linear polarization, an S circular polarization, a P linear polarization and a P circular polarization may be converted to an S circular polarization, a P linear polarization, a P circular polarization and an S linear polarization, respectively.

Since the objective lens 20 is inserted between the first quarter wave plate 18 and the digital storage medium 2 and, therefore, disposed on the propagation path of the first beam, the first beam with an P circular polarization is converged by the objective lens 20 and, then, introduced to the digital storage medium 2. Therefore, a beam spot of the first beam with the P circular polarization may be formed on a reflective layer in the digital storage medium 2.

The first beam introduced through the introduction path S1 is reflected by the reflective layer of the digital storage medium 2. Since the introduction path S1, i.e., the propagation path, is perpendicular to the digital storage medium 2, a reflected beam of the first beam is reflected back to the objective lens 20 so that the reflected beam may propagate in the reflection path, i.e., in the reverse direction of the introduction path S1. Since the reflective layer of the reflective storage medium contains the reflective signal, the reflected beam generated by the reflective storage medium contains the reflective signal. Though the conventional holographic storage medium does not require the reflective layer, the holographic storage medium in accordance with the present invention includes an additional reflective layer as well as a holographic recording layer as will be described hereinafter so that the reflected beam may be generated on the propagation path in accordance with the present invention.

The reflected beam is introduced to the objective lens 20 to be propagated through the propagation path. Specifically, the reflected beam is transmitted through the objective lens 20 to become a collimated beam. Then, the reflected beam is transmitted through the first quarter wave plate 18 so that the polarization of the reflected beam is converted from the P circular polarization to an S linear polarization. In the result, the introduction path S1 and the reflection path thereof form the propagation path in accordance with the present invention and the objective lens 20 and the first quarter wave plate 18 as propagation units are used to propagate the reflected beam through the propagation path.

Figure 2A:
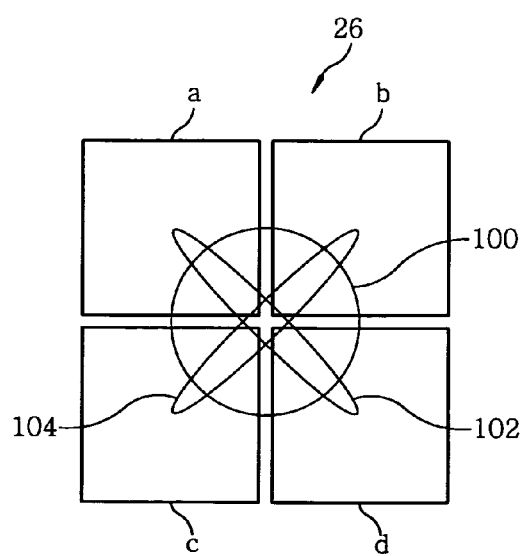
FIGS. 2A and 2B describe a reflective and a reconstructed signal beam detected by a reflective and a holographic detector, respectively.

Then, the PBS 16 causes the reflected beam to be split from the propagation path. Specifically, since the reflected beam has an S linear polarization, the reflected beam is reflected by the PBS 16 once more in accordance with an inherent characteristic of the PBS 16 as described above so that the reflected beam is split from the propagation path and introduced to the cylindrical lens 22. Referring to FIG. 2A, there are shown shapes of the reflected beam transmitted through the cylindrical lens 22. The shapes are dependent on whether or not the first beam transmitted through the objective lens 20 is focused on the reflective layer of the digital storage medium 2. Specifically, the cylindrical lens 22 causes the circular reflected beam to be converged into a circle 100 or an ellipse 102 or 104. The reflective detector 26 has four optical detectors (such as photodiodes) a, b, c and d disposed at four corners, respectively, as shown in FIG. 2A. If the first beam is exactly focused on the reflective layer in the digital storage medium 2, the reflected beam transmitted through the cylindrical lens 22 maintains its circular shape 100 as shown in FIG. 2A so that the beam intensities detected by the four optical detectors a, b, c and d may be identical to each other. On the other hand, if the first beam is not exactly focused on the reflective layer, the circular shape of the reflected beam transmitted through the cylindrical lens 22 is modified into an ellipse 102 or 104 as shown in FIG. 2A so that the beam intensities detected by the four optical detectors a, b, c and d are different from each other. Accordingly, a focusing servo signal F may be obtained from a difference between two intensity sums of two sets of diagonally-disposed optical detectors $\{a, d\}$ and $\{b, c\}$ as follows:

$$F=\{I(a)+I(d)\}-\{I(b)+I(c)\}$$

wherein two sets of optical detectors $\{a, d\}$ are $\{b, c\}$ are diagonally-disposed, respectively, and I(a), I(b), I(c) and I(d) are beam intensities detected by four optical detectors a, b, c and d, respectively. The focusing servo signal F is provided to the control unit 28 to control a location of the objective lens 20 facing the digital storage medium 2 so that the objective lens 20 is exactly focused on the reflective layer in the digital storage medium 2.

If the reflective storage medium is used as the digital storage medium 2, the reflective signal O may be obtained from a total sum of four beam intensities detected by the four optical detectors a, b, c and d, and a tracking servo signal T may be obtained from a difference between a left and a right intensity sum or between an upper and a lower intensity sum, wherein the left, the right, the upper and the lower intensity sum represent sums of beam intensities detected by two left, two right, two upper and two lower optical detectors (a,c), (b,d), (a,b) and (c,d), respectively. The reflective signal O and the tracking servo signal T are calculated as follows:

$$O=I(a)+I(b)+I(c)+I(c)$$

$$T=\{I(a)+I(b)\}-\{I(c)+I(d)\} \text{ or } T=\{I(a)+I(c)\}-\{I(b)+I(d)\}.$$

In the result, the PBS 16, the cylindrical lens 2 and the reflective detector 26 as a reflective signal detection unit cause the reflected beam to be split from the propagation path. The reflected beam is used to extract the reflective signal O recorded in the reflective storage medium. Further, the reflected beam is used to extract the tracking servo signal T for implementing a tracking servo for the reflective storage medium and extract the focusing servo signal F for implementing a focusing servo for the digital storage medium 2 including the reflective storage medium and the holographic storage medium.

Referring back to FIG. 1, the second laser 30 generates the second beam, i.e., a green laser beam with the second wavelength of 532 nm and an S linear polarization. The second beam is introduced along a second beam path S2. If necessary, it may be checked whether the digital storage medium 2 is the reflective storage medium or the holographic storage medium and the second laser 30 is activated based on the detection result. Specifically, the second laser 30 may be activated to generate the second beam only if the holographic storage medium is used as the digital storage medium 2 and, if otherwise, the second laser 30 may not be activated so that there is no second beam. Since the second beam is interfered with only the holographic interference pattern in the holographic storage medium to generate the reconstructed signal beam as will be described hereinafter, even if the reflective storage medium is used instead of the holographic storage medium, there is no reconstructed signal beam extracted from the reflective storage medium.

Since the second quarter wave plate 32 is faced with the second laser 30, the second beam is transmitted through the second quarter wave plate 32 so that the polarization of the second beam may be converted from an S linear polarization to the S circular polarization. The second beam is transmitted through the reducing unit 34, e.g. a lens, so that the beam size of the second beam may be reduced to a predetermined size, e.g., 100 μm. Since the beam size is proportional to a depth of focus, if the beam size of the second beam is reduced to about 100 μm, the depth of focus thereof is so deep, e.g., about 4.7 mm, that the focusing servo for the second beam may not be required. On the other hand, if the beam size of the second beam is further reduced to about 1 μm, the depth of focus thereof is so shallow, e.g., 0.5 μm, that the focusing servo of the second beam on the digital storage medium must be required. The second beam with the beam size of about 100 μm and the S circular polarization is reflected by the mirror 36 so that the second beam may propagate to the digital storage medium 2 through the beam path S2 as the reconstructing beam for reconstructing the holographic signal. Only if the holographic storage medium is used as the digital storage medium 2, the second beam, i.e., the reconstructing beam, is interfered with the holographic storage medium to generate the reconstructed signal beam which may propagate through the objective lens 20 along the propagation path. If the reflective storage medium is used as the digital storage medium 2, the second beam is simply reflected by the reflective storage medium so that there is no signal introduced to the objective lens 20.

During the recording process of the holographic storage medium, the reference beam and the modulated signal beam conventionally propagate along the reverse direction of the second beam path S2 and the first beam path S1 to generate the holographic interference pattern, respectively. Therefore, if the reconstructing beam is introduced along the second beam path S2, the reconstructed signal beam generated by the holographic storage medium may propagate through the objective lens 20 along the reverse direction of the first beam path S1. Since the polarization of the reconstructed signal beam is identical with that of the reconstructing beam, the reconstructed signal beam has the S circular polarization. The reconstructed signal beam is transmitted through the objective lens 20 to be converted as the collimated beam. The first quarter wave plate 18 causes the polarization of the reconstructed signal beam to be changed from the S circular polarization to a P linear polarization so that the reconstructed signal beam with the P linear polarization propagates to the PBS 16.

Figure 2B:
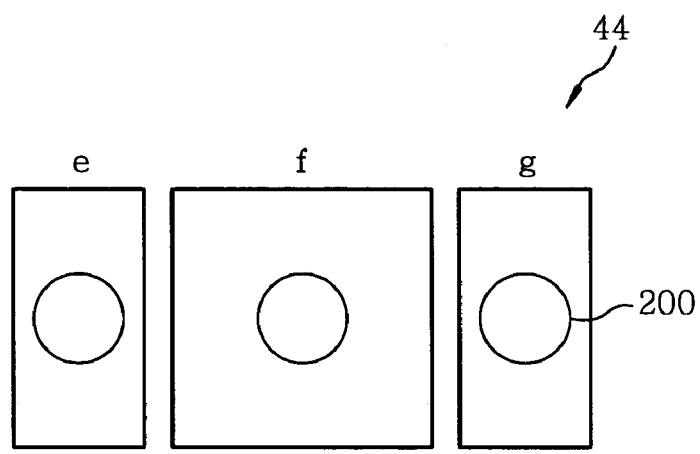

Since the PBS 16 causes a beam of a P linear polarization to be transmitted and a beam of an S linear polarization to be reflected, the reconstructed signal beam with the P linear polarization is transmitted through the PBS 16 to propagate to the laser line mirror 14. As shown in FIG. 4, since the laser line mirror 14 causes the second beam with the second wavelength of 532 nm to be reflected, the reconstructed signal beam with the second wavelength of 532 nm is reflected by the laser line mirror 14 so that the reconstructed signal beam is separated from the propagation path. Then, the reconstructed signal beam is converged by using the first lens 38 and, then, three pin holes formed in the pinhole plate 40 are used to extract the holographic signal corresponding to three portions of a target track or three neighboring tracks including the target track from the reconstructed signal beam. Referring to FIG. 2B, there is shown the holographic signal corresponding the three portions or the three neighboring tracks. After the holographic signal corresponding to the three portions or the three neighboring tracks is diffracted by the three pinholes, it is converged by the second lens 42 once more so that it may be detected by the holographic detector 44.

The holographic detector 44 has three sensors e, g and f which detect intensities of the holographic signal corresponding to three neighboring tracks, respectively, so that the detection result of the intensities are provided to the controller 28. The controller 28 determines if two intensity differences between a central censor f and two neighboring censors e and g are identical to each other or not. If one intensity difference identical to the other intensity difference, the tracking servo for the holographic storage medium is normal and, if otherwise, a tracking servo signal is generated to move the objective lens 20 in parallel against the holographic storage medium so that the tracking servo on the objective lens 20 may be completed. If two intensity differences are identical to each other, the intensity of the central sensor may be detected as the holographic signal. As described above, the laser line mirror 14, the holographic detector 44 are used as the holographic signal detection unit for separating the reconstructed signal beam from the propagation path and detecting the holographic signal stored in the holographic storage medium from the reconstructed signal beam.

Figure 3:
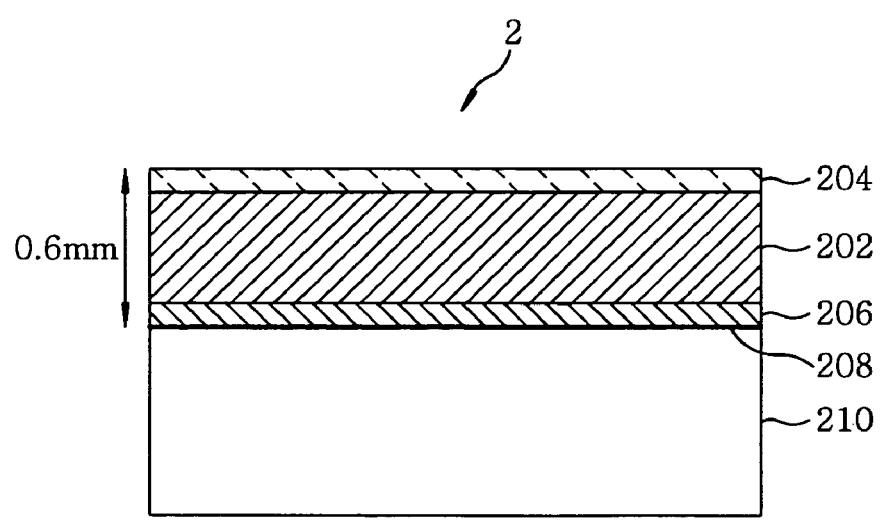
FIG. 3 represents a cross sectional view of a holographic storage medium in accordance with the present invention.

Referring to FIG. 3, there is shown a holographic storage medium. The holographic storage medium has a holographic recording layer 202, an upper and a lower transparent protective layer 204, 206, a reflective layer 208 and a base layer 210. The holographic recording layer 202 stores the holographic interference pattern formed between the reference beam and the modulated signal beam, the reference beam and the modulated signal beam being the green laser beam having the second wavelength of 532 nm. The upper and the lower transparent protective layer 204, 206 for protecting the holographic recording layer 202 are located on and beneath the holographic recording layer 202, respectively. The reflective layer 208 for reflecting the first beam to generate the reflected beam is located beneath the lower transparent protective layer 206. The base layer 210 is located beneath the reflective layer 208.

The conventional DVD has a total thickness of 1.2 mm and the reflective layer, i.e., a reflective recording layer which may be read out by using the reflective property, is located around a half of the total thickness, e.g., in a range of about 0.55 mm to about 0.65 mm. Accordingly, in order to pick up the reflective storage medium such as DVD and the holographic storage medium by using a pick-up apparatus such as a DVD pick-up apparatus, it is preferable that the reflective layer of the holographic storage medium is also located in a range of about 0.55 mm to about 0.65 mm which corresponds to a half of the total thickness of the holographic storage medium as located in the reflective storage medium such as DVD.

The present invention is not limited to the preferred embodiment for illustration as described above. For example, referring to FIG. 1, since the PBS 16 causes a P linear polarization to be transmitted but an S linear polarization to be reflected, the first beam is introduced to the digital storage medium 2 as a P circular polarization while the second beam is introduced to the digital storage medium 2 as a S circular polarization. However, if the PBS 16 causes an S linear polarization to be transmitted but a P linear polarization to be reflected, the first beam is introduced to the digital storage medium 2 as an S circular polarization while the second beam is introduced to the digital storage medium 2 as a P circular polarization.

As described above, a pick-up apparatus having two lasers and two detection units is used to pick up the holographic storage medium and the reflective storage medium. Without an objective lens for the holographic storage medium, only an objective lens for the reflective storage medium may be used to reconstruct the holographic signal from the holographic storage medium. In this case, the focusing servo unit used for the reflective storage medium is advantageously used to implement a focusing servo scheme for the holographic storage medium.

While the invention has been shown and described with respect to the preferred embodiments, it will be understood by those skilled in the art that various changes and modifications may be made without departing from the spirit and the scope of the invention as defined in the following claims.

What is claimed is:

1. A pick-up apparatus for a digital storage medium including a holographic storage medium in which a holographic property is used to reconstruct a holographic signal stored therein and a digital versatile disk in which a reflective property is used to read a reflective signal stored therein comprising:
    means for generating a first and a second beam each of which has different wavelength;
    means for propagating a reflected beam and a reconstructed signal beam through a propagation path, wherein the digital storage medium reflects the first beam to generate the reflected beam having the reflective signal therein and a holographic interference pattern in the holographic storage medium diffracts the second beam to generate the reconstructed signal beam having the holographic signal therein;
    means for splitting the reflected beam from the propagation path to detect the reflective signal from the reflected beam;
    means for separating the reconstructed signal beam from the propagation path to detect the holographic signal from the reconstructed signal beam,
    wherein the propagation path is substantially perpendicular to the digital storage medium,
    wherein the propagating means includes an objective lens, faced with the digital storage medium, for converging the first beam on a reflective layer in the digital storage medium so that the reflected beam of the first beam is generated and receiving the reflected beam and the reconstructed signal beam to be propagated through the propagation path,
    wherein the propagating means further includes means for converting polarizations of the first beam, the reflected beam and the reconstructed signal beam from an S linear polarization to an S circular polarization, from an S circular polarization to a P linear polarization, from a P linear polarization to a P circular polarization or from a P circular polarization to an S linear polarization, and
    wherein the first and the second beam are introduced to the digital storage medium with a P and an S circular polarization, respectively, or the first and the second beam are introduced to the digital storage medium with an S and a P circular polarization, respectively.

2. The pick-apparatus of claim 1, wherein the converting means is a quarter wave plate.

3. The pick-up apparatus of claim 1, wherein the splitting means includes:
    beam splitter, disposed on the propagation path, for extracting the reflected beam from the propagation path;
    cylindrical lens for generating a focusing servo signal from the reflected beam;
    reflective detector for detecting the reflective signal and the focusing servo signal from the reflected beam; and
    controller for controlling the objective lens to be focused on the digital storage medium based on the focusing servo signal.

4. The pick-up apparatus of claim 3, wherein the beam splitter si a polarizing beam splitter for splitting a beam based on the polarization thereof.

5. The pick-up apparatus of claim 4, wherein the reflective detector has four optical detectors disposed at four corners, respectively, wherein the focusing servo signal is obtained by a difference between two intensity sums of two sets of diagonally-disposed optical detectors and the reflective signal is obtained by an intensity sum of the four optical detectors.

6. The pick-up apparatus of claim 1, wherein the separating means includes:
    means, disposed on the propagation path, for transmitting the first beam or the reflected beam thereof and reflecting the second beam or the reconstructed signal beam thereof; and
    holographic detector for detecting the holographic signal from the reconstructed signal beam.

7. The pick-up apparatus of claim 6, wherein the transmitting means is a laser line mirror.

8. The pick-up apparatus of claim 1, wherein the separating means further includes:
    means for generating a tracking servo signal for the holographic storage medium from the reconstructed signal beam.

9. The pick-up apparatus of claim 1, wherein the holographic storage medium includes:
    a reflective layer for reflecting the first beam to generate the reflected beam; and
    a holographic recording layer, disposed on the reflective layer, for storing the holographic interference pattern by which the second beam is diffracted to generate the reconstructed signal beam.

10. The pick-up apparatus of claim 1, wherein the holographic interference pattern is caused by interference between a reference and a signal beam and the second beam is a complex conjugate of the reference beam.

11. A pick-up apparatus for a digital storage medium including a holographic storage medium in which a holographic property is used to reconstruct a holographic signal stored therein and a reflective storage medium in which a reflective property is used to read a reflective signal stored therein comprising:

first and second laser for generating a first and a second beam with a first and a second wavelength which are different from each other, respectively, wherein the first beam and the second beam have a P and an S linear polarization, respectively;

means, faced with the second laser, for converting a polarization of the second beam from the S linear polarization to an S circular polarization;

means for introducing the second beam with the S circular polarization to the holographic storage medium so that the second beam is diffracted by a holographic interference pattern in the holographic storage medium to generate a reconstructed signal beam having the holographic signal therein;

separating means, disposed on a propagation path of the first beam, for transmitting a beam with the first wavelength and reflecting a beam with the second wavelength;

splitting means, disposed on the propagation path of the first beam, for transmitting a beam with a P linear polarization and reflecting a beam with an S linear polarization;

changing means, faced with the splitting means and disposed on the propagation path of the first beam, for changing a polarization of the first beam so that the polarization of the first beam is changed from a P linear polarization to a P circular polarization; and means, faced with the changing means and disposed on the propagation path of the first beam, for converging the first beam on a reflective layer in the digital storage medium to generate a reflected beam having the reflective signal therein and receiving the reflected and the reconstructed signal beam to be propagated through the propagation path, wherein the reflected and the reconstructed signal beam are transmitted through the changing means so that polarizations of the reflected and the reconstructed signal beam are changed from a P and an S circular polarization to an S and a P linear polarization, respectively, the reflected beam with the S linear polarization is reflected once more by the splitting means so that the reflective signal is detected form the reflected beam, and the reconstructed signal beam with the second wavelength is reflected by the separating means so that the holographic signal is detected from the reconstructed signal beam.

12. The pick-up apparatus of claim 11, wherein the propagation path is substantially perpendicular to the digital storage medium.

13. The pick-up apparatus of claim 11, wherein the converting means and the changing means are a quarter wave plate for converting a polarization of a beam from an S linear polarization to an S circular polarization, from an S circular polarization to a P linear polarization, from a P linear polarization to a P circular polarization, or from a P circular polarization to a P linear polarization.

14. The pick-up apparatus of claim 11, wherein the separating means is a laser line mirror.

* * * * *